May 12, 1931.  A. NELSON  1,805,149

METHOD OF BALANCING PROPELLER BLADES

Filed Dec. 12, 1928

INVENTOR
ARVID NELSON
BY
Dodson + Roe
ATTORNEYS

Patented May 12, 1931

1,805,149

UNITED STATES PATENT OFFICE

ARVID NELSON, OF MILWAUKEE, WISCONSIN, ASSIGNOR TO THE HAMILTON STANDARD PROPELLER CORPORATION, OF WEST HOMESTEAD, PENNSYLVANIA, A CORPORATION OF PENNSYLVANIA

METHOD OF BALANCING PROPELLER BLADES

Application filed December 12, 1928. Serial No. 325,490.

My invention relates more specifically to propeller blades which are used on aircraft, and which must be accurately balanced to be of service.

My invention has for its object, to provide a very accurate means to obtain the required balance, and to accomplish that result in a cheaper and easier way than is now employed.

My means of accomplishing the foregoing object may be more readily understood by having reference to the accompanying drawings, which are hereto annexed and are a part of this specification, in which—

Figure 1:
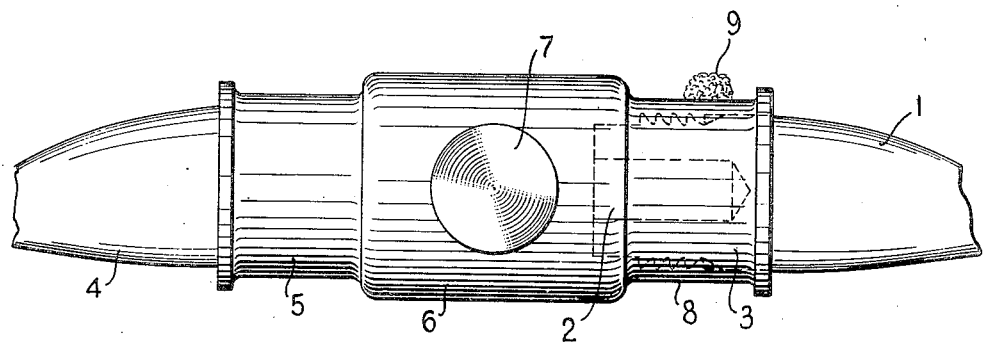
Figure 2:
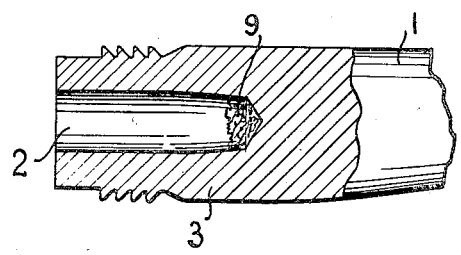

Fig. 1 is a fragmentary view of a propeller, showing the blades mounted in a hub for balancing, the material used for that purpose being shown on the exterior of the hub; and Fig. 2 is a sectional view, showing the balancing material in permanent position.

Similar reference numerals refer to similar parts throughout the entire description.

As shown in the drawings, the propeller blade 1 has a central hole 2 formed or drilled into its shank 3. A master blade 4 is screwed or otherwise fitted to the arm 5 of the hub 6, which is mounted on the end 7 of the balancing shaft, and secured thereto in any of the standard ways utilized for that purpose.

Assuming the hub 6 as having the master blade 4, and the new blade 1 mounted in the other arm 8 of the hub 6, I place a quantity of lead wool 9 on the exterior of the arm 8 in the proper position to register with the opening 2 in the shank 3 of the blade 1. As may be seen in the drawing this position is substantially in a plane passing through the opening 2 at right angles to the axis of the blade 1. When thus positioned the lead wool 9 is at a distance from the axis of rotation of the propeller substantially equal to the distance from the bottom of the opening 2 to said axis. Lead wool is then added to or taken from the amount on the hub arm 8 until a perfect static balance is obtained, when the blade 1 is removed from the arm 8 and the lead wool is placed in the opening 2 and, by means of a suitable rod and a hammer, is driven into the hole 2 until the lead wool 9 is practically united to the metal of which the shank 3 is formed.

I am aware that propellers are balanced by placing lumps of lead inside the shank until a balance is obtained, and the lead is then melted and the molten metal poured into the hole in the shank, but it is difficult to obtain the extreme nicety of balance required in a propeller, and the action of the heat on the metal is further objectionable.

Although I have described the balancing material as lead wool, it will be obvious that any other material possessing similar characteristics may be used, and I therefore do not desire to be understood as limiting myself to the specific material described.

Having described my invention, what I regard as new, and desire to secure by Letters Patent of the United States, is:

1. In the method of balancing propeller blades for aircraft, the steps of fitting a master blade to one arm of a hub; fitting a new blade to the opposite arm of said hub, said new blade having an axial recess in its shank; placing a sufficient quantity of material on the exterior of the shank of said new blade radially from said recess to statically balance said blades; and subsequently placing said material in said recess and securing it in the bottom of said recess solely by compression of said material.

2. The method of balancing a propeller blade for aircraft having a weight-receiving cavity, including the steps of fitting a master blade to one arm of a hub, fitting the blade to be balanced to the opposite arm of said hub, placing a sufficient quantity of lead wool outside the blade in a plane through the weight-receiving cavity and perpendicular to the axis of the blade to statically balance said blades, and subsequently placing said lead wool in the weight-receiving cavity and securing it therein by compressing it.

3. The method of balancing a propeller blade for aircraft having a weight-receiving cavity that includes the steps of fitting a master blade to one arm of a hub, fitting the blade to be balanced to the opposite arm of said hub, placing a sufficient quantity of lead wool outside the latter blade at a distance from the axis of rotation of the propeller equal to the distance from the cavity to said axis to statically balance said blades, and subsequently placing said lead wool in the weight-receiving cavity and securing it therein by compressing it.

ARVID NELSON.